No. 863,168. PATENTED AUG. 13, 1907.
T. GRISWOLD, Jr.
MEANS FOR USE IN SEPARATING THE MORE SOLUBLE CONSTITUENTS
OF A MATERIAL FROM THE LESS SOLUBLE CONSTITUENTS THEREOF.
APPLICATION FILED JAN. 17, 1906.
4 SHEETS—SHEET 1.
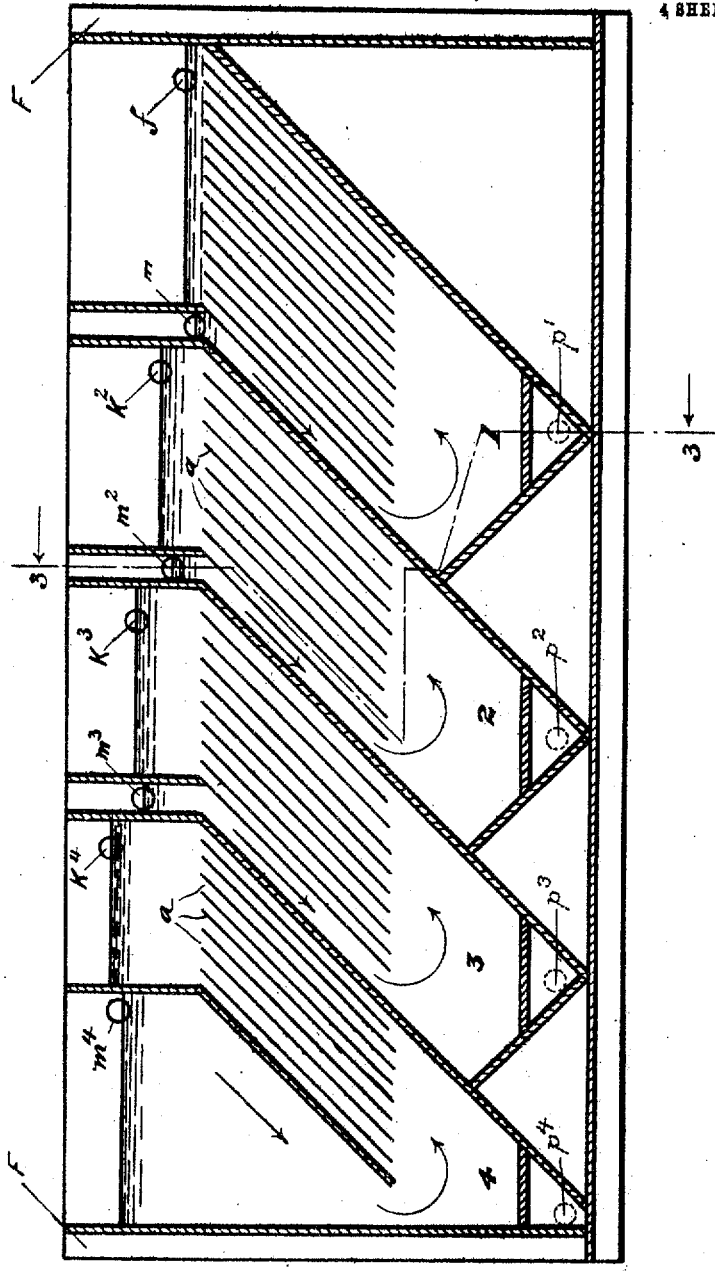

No. 863,168. PATENTED AUG. 13, 1907.
T. GRISWOLD, Jr.
MEANS FOR USE IN SEPARATING THE MORE SOLUBLE CONSTITUENTS
OF A MATERIAL FROM THE LESS SOLUBLE CONSTITUENTS THEREOF.
APPLICATION FILED JAN. 17, 1906.
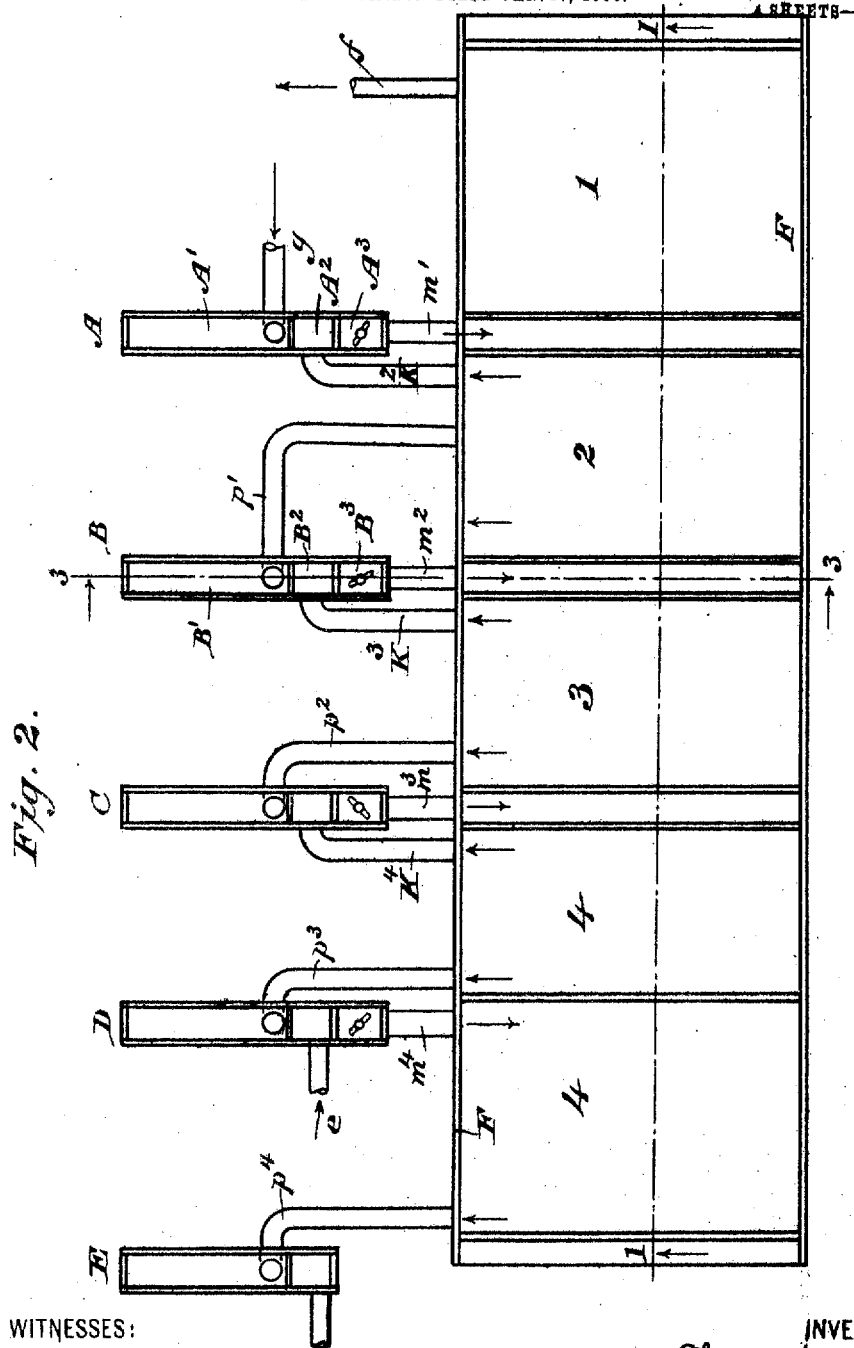

No. 863,168. PATENTED AUG. 13, 1907.
T. GRISWOLD, Jr.
MEANS FOR USE IN SEPARATING THE MORE SOLUBLE CONSTITUENTS
OF A MATERIAL FROM THE LESS SOLUBLE CONSTITUENTS THEREOF.
APPLICATION FILED JAN. 17, 1906.
4 SHEETS—SHEET 3.
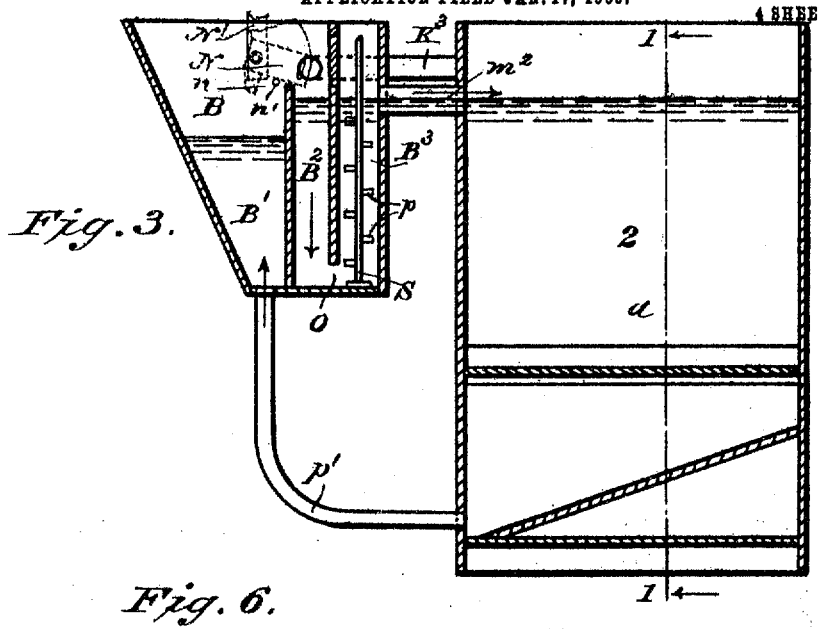
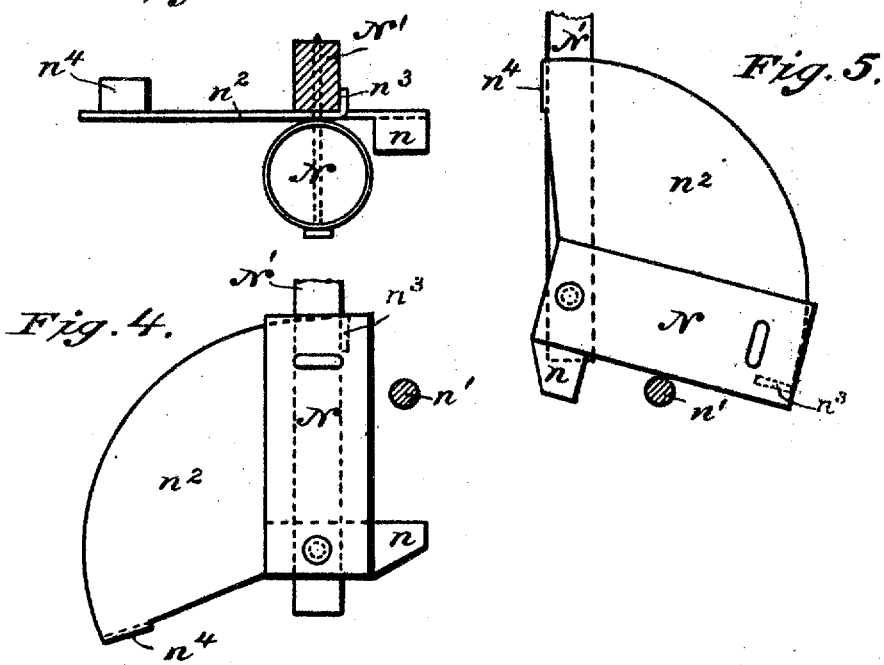
WITNESSES:
Jno. F. Oberlin
G. W. Saywell
INVENTOR
Thomas Griswold, Jr.
by his attorney
J. R. Fay No. 863,168. PATENTED AUG. 13, 1907.
T. GRISWOLD, Jr.
MEANS FOR USE IN SEPARATING THE MORE SOLUBLE CONSTITUENTS
OF A MATERIAL FROM THE LESS SOLUBLE CONSTITUENTS THEREOF.
APPLICATION FILED JAN. 17, 1906.
4 SHEETS—SHEET 4.
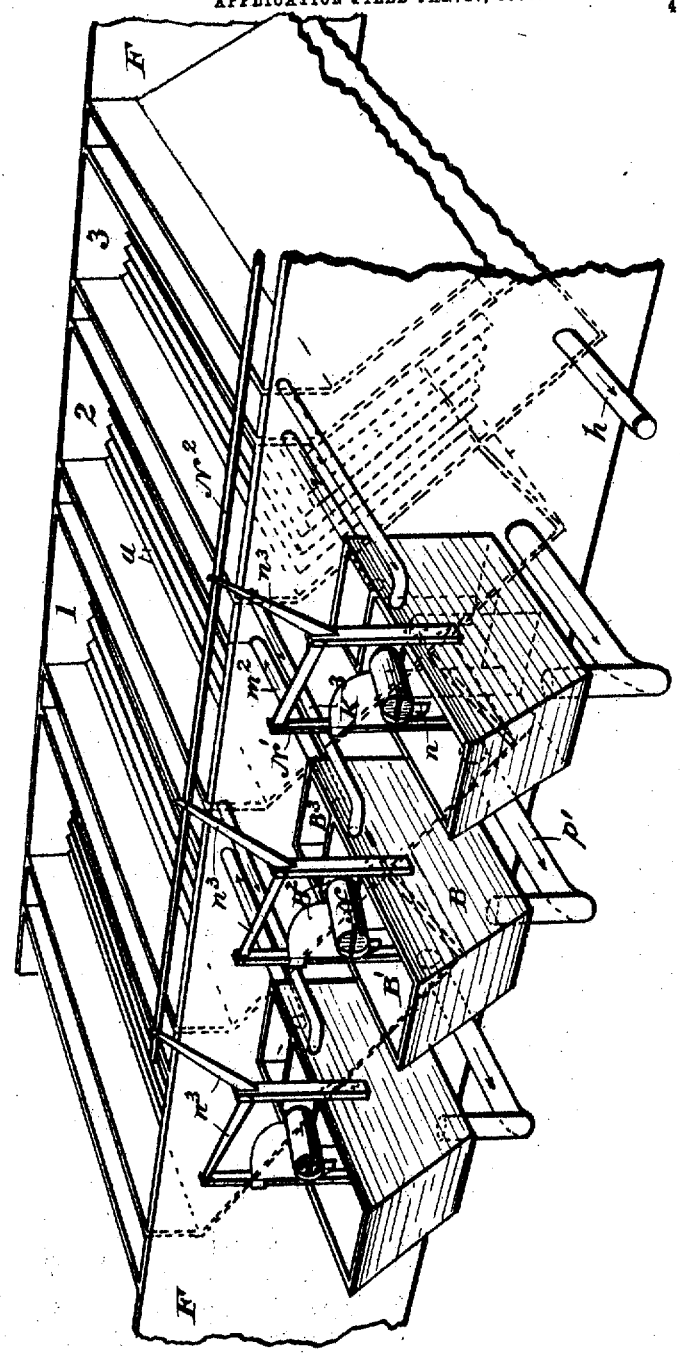

UNITED STATES PATENT OFFICE.

THOMAS GRISWOLD, JR., OF MIDLAND, MICHIGAN, ASSIGNOR TO THE ONTARIO NICKEL COMPANY, LIMITED, OF WORTHINGTON, ONTARIO, CANADA, A CORPORATION.

MEANS FOR USE IN SEPARATING THE MORE SOLUBLE CONSTITUENTS OF A MATERIAL FROM THE LESS SOLUBLE CONSTITUENTS THEREOF.

No. 863,168.      Specification of Letters Patent.      Patented Aug. 13, 1907.

Application filed January 17, 1906. Serial No. 296,552.

*To all whom it may concern:*

Be it known that I, THOMAS GRISWOLD, Jr., a citizen of the United States, a resident of Midland, county of Midland, and State of Michigan, have invented a new and useful Improvement in Means for Use in Separating the More Soluble Constituents of a Material from the Less Soluble Constituents Thereof, of which the following is a specification, the principle of the invention being herein explained and the best mode in which I have contemplated applying that principle, so as to distinguish it from other inventions.

This invention relates to the art of separating the more readily soluble constituents of materials from their less readily soluble or insoluble constituents by the process of washing, and is particularly adapted to the treatment of flocculent precipitates, slimes, pulps, muds, sediments, and the like, the treatment of which constitutes an important feature of many industrial processes. It is also adapted to the washing of impurities and mother liquors out of crude products, the extraction of metals or the salts of metals from their ores, the extraction of sugars, extracts, colors, dyes, and the like. The object of such washing is usually to dissolve or take up, by means of a fluid solvent or wash, the soluble matter or "values" contained in the material being treated, and to thereby separate these soluble "values" from the less soluble material or insoluble material, sediment, or sludge and from the insoluble matter that remains therein. By the term "values" is meant the substances to be recovered or, in some processes, the impurities to be eliminated. These "values" may be capable of solution in a solvent, and, in that case, the separation would be based upon that solubility; or, the "values" may be capable of separation from the other constituents of the material being treated by reason of their capacity to remain mechanically suspended for some time in a fluid medium, similarly to the separation of slimes in ordinary water gigs. It will be seen from the further description of my invention that the capacity of any single constituent or several constituents to remain mechanically suspended for some time in a fluid medium is equivalent, in so far as the separation from the other constituents is concerned, to that constituent's entering into solution.

As an example of the washing process referred to, take a case in which it is desired to remove iron from an aqueous solution in which it exists as a soluble salt in conjunction with soluble salts of other metals incapable of precipitation by the reagent which is used to precipitate the iron, such a salt being, for example, sodium chlorid. The iron may be precipitated by the addition of a proper proportion of an alkaline carbonate or hydrate, and, after agitation and settling, the flocculent iron precipitate will subside as a pulp or sludge and the clear solution of a part of the unprecipitated metals remain over it. This separation, although quite distinct, is a very slow one, is more dependent upon the area of the separating chamber than upon its depth, and the pulp cannot be settled to a concentrated form in any reasonable length of time, nor in any reasonable amount of apparatus. The pulp, moreover, contains a low percentage of iron and also contains a correspondingly high percentage of water. The "values" remaining in solution in the pulp may be reduced by dilution with more water, agitation and resettling. Repeated washings, settlings and decantations will ultimately extract practically all the soluble "values" in the pulp, but in very much diluted solution, and at the expense of much solvent, although weak wash water may be systematically increased in strength, as ordinarily practiced, by being used with pulps of a progressively increasing percentage of "values". The treatment of large quantities of materials by the above method requires the use of many large chambers provided with stirring devices and power to drive them, and the tying up of a large money investment in material in process, and, consequently, this progressive treatment cannot be utilized to the fullest extent because of a commercially prohibitive complication of apparatus and supervision. Some pulps are easily treated by filtration, leaching, settlement and decantation, or other processes. Some are of a colloidal nature and filtration will not readily remove the colloids. Others will clog a filter so soon that filtration is impracticable.

My invention is especially adapted to treat rapidly and efficiently those slimes or pulps which, having a slow rate of settling, make separation by settlement and decantation, as ordinarily practiced, very slow, and which are not adapted to economical treatment by filtration or leaching.

The invention aims to accomplish the separations above outlined, or, by suitable adaptation, to accomplish such separations as are required in other industries, as, for instance, the recovery of cyanid of gold from slimes.

The object of my present invention is to wash the pulp and to then remove and wash the resulting sludge, these washing and settling operations being automatically repeated any desired number of times; and further, to accomplish these results in a rapid, economical and efficient manner.

Further objects are to reduce the investment in apparatus and machinery, to remove the "values" in pulps, slimes, etc., to as full an extent as may be desired, to reduce to a low sum the investment tied up in the material in process, and to extract the soluble matter in as concentrated a form as possible, thereby reducing the quantity of solvent or wash-water required, and the tankage necessary to hold the extracted "values". This latter improvement, viz. that of extracting the "values" in as concentrated a form as possible and thereby reducing the tankage, will be found to be a very important part of my invention.

This invention constitutes in effect a combination of devices whereby solvent or washing fluid is caused to traverse in one direction through a series of settling and mixing chambers, and pulp or sludge is simultaneously caused to traverse in the opposite direction through the same series. The sludge is thereby repeatedly washed, settled and rewashed in solvent of progressively increasing solvent power, and carrying a decreasing burden of "values", until when discharged at the end of the series, the sludge is practically deprived of soluble "values". The arrangement of the apparatus is such that the solvent entering the series fresh is used first to wash sludge that has been deprived of nearly all its soluble "values". The partly charged solvent is thereafter used in the subsequent settling and mixing chambers of the series to successively wash the charges of sludge, each of which charges is somewhat stronger in soluble "values" than the previous one. The effect upon the fresh solvent is to successively add to its quantities of soluble "values" until when the solvent leaves the series it is highly charged with these "values".

The annexed drawings and the following description set forth in detail certain means embodying the invention and one mode of carrying out the same, such disclosed means and mode constituting but one of various ways in which the principle of the invention may be used. Of such disclosure, it should be stated the mechanical features alone are herein claimed, the general process, or method of operation, which these exemplify being reserved for a separate application filed January 12, 1907, Serial No. 351,939.

In said annexed drawings: Figure 1 is a vertical longitudinal section of a preferred form of the washing apparatus. Fig. 2 is a top plan view of the same. Fig. 3 is a vertical transverse section taken on the line 3—3 of Figs. 1 and 2. Fig. 4 is a side elevation of the apparatus for dipping the fluid or semi-fluid sludge from one chamber-compartment to another, the dipping vessel being shown in its lifting position. Fig. 5 is a similar view, showing the vessel in its discharging position. Fig. 6 is a top plan view of the parts illustrated in Fig. 4. Fig. 7 is a perspective of a part of the washing apparatus in which, for the sake of clearness, the stirring devices are omitted. This figure shows the means of operating the dippers.

The apparatus consists in a series of settling chambers, the consecutive chambers of the series being connected together by pipes or conduits, there being interposed in the length of each conduit a suitable mixing apparatus for mixing the sediment or sludge taken from the bottom of one settling chamber with the solvent solution drawn from the top of that settling chamber which is two removed from the one from which the sediment is taken. While I have shown the mixing chambers built separately and connected by pipes to the settling chambers, it would be entirely within the spirit of my invention to build the mixing chambers as an integral part of the separating chambers, in which case the pipes or conduits could be replaced by openings in the partition walls.

In general the method of operation is as follows:— The pulp or other material to be treated is admitted to the first mixing chamber of the series where solvent that contains a large per cent of soluble "values" is added to it. The mixture of pulp and solvent thus formed is settled in the first separating chamber of the series, the effect of settling being to separate the mixture into a sludge weaker in soluble "values" than the original pulp, and a solvent more heavily charged with soluble values than before. The heavily charged solvent is discharged from the apparatus and then the sludge that remains is passed to the next mixing chamber, where it is again mixed with solvent weaker in soluble "values" than the solvent employed in the first mixing chamber. The resultant mixture is again settled in the next separating chamber of the series and is by so settling once more separated into a still weaker sludge and a more heavily charged solvent. The process continues through the whole series of receptacles until the resultant sludge deprived of practically all of its soluble "values" is discharged at the end of the series.

In the drawings F is a vessel containing the settling chambers 1, 2, 3, 4, which are preferably hopper-bottomed. While I have shown and described the settling chambers of the series built in one tank structure F, I do not desire to confine myself to such construction, it being obvious that the various settling chambers might be separated if desired.

In each receptacle I prefer to provide inclined baffle plates $a$ which extend across the tank F from side to side. The purpose of these baffle plates is to increase the area of surface upon which the sludge may settle, to reduce the vertical distance through which any given particle of suspended sludge must fall before meeting a contacting surface, thereby increasing the working capacity of the separating chambers over the capacity they would have were the baffle plates omitted.

A, B, C, D, and E are termed "mixing chambers", their office being to mix the sludge or sediment from one settling chamber with solvent from the settling chamber two removed therefrom. These mixing chambers are small tanks divided into three compartments $B'$, $B^2$, and $B^3$, as shown in Fig. 3. The first compartment $B'$ receives the sludge from the bottom of the settling chamber 1, the sludge passing though the pipe $p''$. The sludge is dipped by means of a mechanical dipper which will be later described, from compartment $B'$ into compartment $B^2$, where it mingles with washing or solvent fluid that enters through the pipe $K^3$ being drawn from a point near or at the surface of the liquid in settling chamber 3. The sludge and solvent pass down to the bottom of compartment $B^2$ and thence through an opening O into compartment $B^3$ in which is mounted a revolving shaft S carrying stirring paddles P. This stirring apparatus thoroughly mixes the sludge and solvent, the mixture being delivered through pipe $m^2$ into the top of settling chamber 2, where the mixture is settled:

Beginning at the left in Fig. 2, fresh wash-water, solvent, or other suitable medium for dissolving or taking up the "values", enters the system at $e$, flows by gravity through the mixing apparatus D and the pipe $m^4$ through successive alternate mixing and settling chambers, as shown by arrows, and runs out at $f$ charged with the soluble "values" which it has taken up from the pulp and sludge during its passage through the apparatus. Untreated pulp is run into the apparatus at $g$, and delivered by means of the dipping mechanism into the middle compartment $A^2$ of the washer A. Here the pulp mixes with the strongly charged solution which runs into $A^2$ from the settling chamber 2 through pipe $K^2$. The mixture flows down and into the agitating compartment $A^3$ where the pulp and solvent are thoroughly mixed and the pulp is washed. From $A^3$ the thin mixture flows through the pipe $m'$ into the settling chamber 1, and thence down diagonally as shown by the arrow in Fig. 1, and up through the spaces between the baffles $a$. Here the sludge drops out and slides down the baffle plates into the hopper below. The concentrated solution leaves the sludge on the baffle plates and flows out at $f$. The sludge which has been separated by settling in receptacle 1 passes by pipe $p'$ into compartment B' of the mixing chamber B. Through the pipe $K^3$ a less concentrated solution simultaneously passes from settling chamber 3 into compartment $B^2$ of mixing chamber B of the mixing apparatus. Thorough mixture takes place in $B^3$, and the resulting fluid is delivered to receptacle 2 where it settles in the same manner as has been described for receptacle 1. In similar manner settled sludge from 2 is washed in C, resettled in 3, and rewashed in D with fresh solvent, resettled in 4 and dipped out of the system by the dipper E. It is thus seen that sludge from the first settling chamber is repeatedly washed in solvent carrying a constantly decreasing burden of "values", until when discharged from E through pipe $h$ the sludge is practically free from soluble "values." The fresh solvent let in at $e$ is repeatedly used to wash the sludge in which the soluble "values" are constantly increasing until when the solvent is let out at $f$ it is highly charged with these "values". This invention then consists in effecting a contrary flow of sludge and solvent through a series of mixing and settling chambers and the consequent production of a solution concentrated in "values". By increasing the number of mixing and settling units in the series, the percentage of soluble "values" remaining in the discharged sludge may be reduced indefinitely and the efficiency of extraction may be raised to a correspondingly high point.

It will be understood from the foregoing description that the successful operation of this apparatus does not depend to any great extent upon the particular form of mechanism by which the sludge is caused to flow from one compartment of the settling chambers through the mixer into another settling chamber during the process of mixing. Any suitable form of device may be used for this purpose without departing from the spirit of my invention, but for the purpose of illustration I have shown a form of dipping apparatus which operates satisfactorily on flocculent precipitates. This dipping apparatus consists in a suitable receptacle or measuring tank N pivotally mounted at its lower end to an upright support N' capable of vertical movement, so that the tank can be dipped into and out of the sludge in the first compartment of the mixing apparatus. To empty the tank when it is raised to the top of its travel I provide a suitable trip $n$ preferably comprising a horizontal projection at the lower end of the tank which contacts with the under side of a suitable fixed stop $n'$ carried by any convenient part of the framework, so as to overbalance the pivotally mounted tank when it reaches the top of its travel. To permit the tank to retain its vertical position after the liquid has been emptied from it and the support N' has assumed its lowermost position, I provide a suitable counterbalance $n^2$ projecting from the side of the tank opposite that on which the trip is located. The vertical movement of the tank and the upright support on which it is mounted may be accomplished by any suitable and convenient means, one form of which is shown in Fig. 7.

To insure that the measuring tank shall always contain the exact amount of sludge so as to produce uniform flow of sludge an opening or perforation may be provided at any desired height at the side of the tank so that the tank cannot fill above that point. I prefer in practice to secure a uniform flow of sludge through the entire apparatus by operating all the various dippers N simultaneously or in rotation, the former being accomplished by the means illustrated in Fig. 7, where three mixing chambers are shown connected to the corresponding settling chambers. The dippers are hung on bell-cranks $n^3$ which are operated by a reciprocating pulling bar $N^2$ to which they are pivotally connected. A to-and-fro motion of the bar causes an up and down motion of the dippers. Some materials, such as sands, finely crushed or ground ores, and the like, will require special forms of dippers and settlers.

With many materials the baffles aid in producing rapid settlement and separation. Various forms of baffles may be used as desired. It should also be pointed out that it is not essential to their proper action that the mixture of solvent and sludge be fed into the settling tanks beneath such baffles as shown in the preferred form of apparatus illustrated, for said mixture may be obviously delivered, if found desirable, on to their tops just as well.

While I have shown and described the apparatus organized to secure the necessary flow of solvent and sludge by dipping the sludge and permitting the solvent to flow by gravity through the receptacles, it is evident that the same purpose might be attained by dipping or pumping both the solvent and sludge, or pumping the solvent and permitting the sludge to flow by gravity.

I wish to call particular attention to the fact that in the claims following this description my choice of names for the two constituents of the material which are separated one from the other, involves the use of "the more soluble constituents" and "the less soluble constituents", and the choice of these names is made advisedly, for the reason that materials which are commonly classed as "insoluble" are regarded by chemists as "soluble", and are differentiated into classes which are "slightly soluble" and "very slightly soluble." This invention is adapted to the separation of the "more soluble" constituents of a material from its "less soluble" constituents. As regards the separation which takes place in each successive settling chamber, the fact should be noted that neither the fluid nor the solid constituents are completely separated. At least, it is not necessary to the successful operation of the invention that they should be so separated. It is necessary only that the mixture be separated to such an extent that one portion contain a larger percentage of the less soluble constituents than the other, or, in some cases, that one portion contain all of the less soluble constituents together with a portion of the more soluble constituents, either undissolved or in solution. The use of the term "separated" is meant to cover all these cases, the eventual result being governed, first, by the kind of material being treated;
secondly, by the number of settling and mixing chambers utilized; and, thirdly, by various changes and modifications which may creep in at times as separate elements to modify the general result, such general result being, as outlined above, the separation of the more soluble constituents of a material from the less soluble constituents thereof.

Having thus described my invention in detail that which I particularly point out and distinctly claim is:

1. In means for use in separating the more soluble constituents of a material from the less soluble constituents thereof, the combination of a series of settling chambers and mixing chambers; means arranged to convey unlike constituents from a plurality of said settling chambers, respectively, to said mixing chambers; and means for circulating all such constituents through said mixing chambers in the same direction.

2. In means for use in separating the more soluble constituents of a material from the less soluble constituents thereof, the combination of a series of settling chambers and mixing chambers; means arranged to convey the upper constituent from some of said settling chambers, and the lower constituent from other of said settling chambers, respectively, to said mixing chambers; and means for circulating both of said constituents through said mixing chambers in the same direction.

3. In means for use in separating the more soluble constituents of a material from the less soluble constituents thereof, the combination of three settling chambers; a mixing chamber; means arranged to convey the upper constituent of one settling chamber and the lower constituent of another settling chamber, respectively, to said mixing chamber; and means arranged to convey both of said constituents to said third separating chamber.

4. In means for use in separating the more soluble constituents of a material from the less soluble constituents thereof, the combination of three settling chambers; a mixing chamber; means arranged to convey the upper constituent of one settling chamber and the lower constituent of another settling chamber, respectively, to said mixing chamber; means for circulating both of said constituents through said mixing chamber in the same direction; and means arranged to convey both of said constituents to said third settling chamber.

5. In means for use in separating the more soluble constituents of a material from the less soluble constituents thereof, the combination of a series of mixing and settling chambers; means adapted to cause said material and a solvent, respectively, to flow through said series of chambers in generally opposite currents; and means adapted to cause said currents to flow in the same direction through said mixing chambers.

6. In means for use in separating the more soluble constituents of a material from the less soluble constituents thereof, the combination of a series of settling chambers;
a mixing chamber; means establishing fluid connection between the latter and a plurality of said settling chambers; independent means establishing fluid connection between said mixing chamber and other of said settling chambers; and means adapted to cause currents of said material and a solvent, respectively, to flow through said settling chambers, mixing chamber and connecting means in general opposite directions.

7. In means for use in separating the more soluble constituents of a material from the less soluble constituents thereof, the combination of a plurality of settling chambers; a mixing chamber; means establishing fluid connections between the latter and two of said settling chambers and arranged to cause the material to flow from the latter to said mixing chamber; and means establishing fluid connection between said mixing chamber and another of said settling chambers, and arranged to cause material to flow from the former to the latter.

8. In means for use in separating the more soluble constituents of a material from the less soluble constituents thereof, the combination of a series of settling chambers; a series of mixing chambers, each settling chamber in one of said series being directly related to a mixing chamber in the other series; conduits establishing fluid connection between the mixing chambers, and a plurality of said settling chambers, and arranged to cause material to flow from the latter to the former; and other conduits arranged to convey material from said mixing chambers to those settling chambers to which said mixing chambers are respectively related.

9. In means for use in separating the more soluble constituents of a material from the less soluble constituents thereof, the combination of a series of settling chambers; a series of mixing chambers, each chamber in one of said series being directly related to a chamber in the other series; conduits establishing fluid connection between the mixing chambers, and a plurality of said settling chambers, said conduits arranged to convey material to said mixing chamber from settling chambers upon both sides of the latter, and other conduits arranged to convey material from said mixing chambers to those settling chambers to which said mixing chambers are respectively related.

10. In means for use in separating the more soluble constituents of a material from the less soluble constituents thereof, the combination of a plurality of settling chambers; a mixing chamber; means establishing fluid connection between the latter and the upper part of one of said settling chambers, and the lower part of another of said chambers, respectively; means establishing fluid connection between said mixing chamber and a third settling chamber; and means for circulating material through said mixing chamber.

11. In means for use in separating the more soluble constituents of a material from the less soluble constituents thereof, the combination of a plurality of settling chambers; a mixing chamber; conduits connecting the latter to the upper part of one of said settling chambers, and to the lower part of another of said chambers, a conduit connecting said mixing chamber to a third settling chamber; and means for circulating material through said mixing chamber.

12. In means for use in separating the more soluble constituents of a material from the less soluble constituents thereof, the combination of a plurality of settling chambers; a mixing chamber; conduits connecting the latter to some of said settling chambers, respectively; means adapted to cause material to flow from said settling chambers, to said mixing chamber; a conduit connecting said mixing chamber to other settling chambers; means adapted to cause material to flow from said mixing chamber to said last-named settling chambers; and means for circulating in the same direction through said mixing chamber all constituents of the material being separated.

13. In means for use in separating the more soluble constituents of a material from the less soluble constituents thereof, the combination of a plurality of settling chambers; a mixing chamber; a conduit connecting the latter to the upper part of one of said settling chambers and adapted to convey material by gravity to said mixing chamber; a conduit connecting the latter to the lower part of another of said settling chambers; means adapted to force material from said last-named settling chambers to said mixing chamber; a conduit connecting the latter to a third settling chamber and adapted to convey material by gravity to said settling chamber; and means for circulating material through said mixing chamber.

14. In means for use in separating the more soluble constituents of a material from the less soluble constituents thereof, the combination of a plurality of settling chambers; a mixing chamber having compartments; conduits connecting said mixing chamber compartments to some of said settling chambers, and adapted to discharge material into said compartments; means adapted to deliver material from one mixing chamber compartment to another; and a conduit adapted to deliver material from said mixing chamber to other of said settling chambers.

15. In means for use in separating the more soluble constituents of a material from the less soluble constituents thereof, the combination of a plurality of settling chambers; a mixing chamber having compartments, a conduit connecting one of said mixing chamber compartments to the lower part of one of said settling chambers; a conduit connecting a second mixing-chamber compartment to the upper part of another of said settling chambers; means adapted to deliver material from one of said mixing-chamber compartments into said second mixing-chamber compartment; and a conduit adapted to deliver material from said second mixing-chamber compartment into a third settling chamber.

16. In means for use in separating the more soluble constituents of a material from the less soluble constituents thereof, the combination of a plurality of settling chambers; a mixing chamber having compartments; a conduit connecting one of said mixing-chamber compartments to the lower part of one of said settling chambers; a conduit connecting a second mixing chamber compartment to the upper part of another settling chamber; a dipping mechanism adapted to deliver material intermittently in predetermined charges from said one mixing chamber compartment into said second mixing chamber compartment; and a conduit adapted to deliver material from said second mixing chamber compartment into a third settling chamber.

17. In means for use in separating the more soluble constituents of a material from the less soluble constituents thereof, the combination of a plurality of settling chambers having baffle plates mounted therein; a mixing chamber; conduits connecting the said mixing chamber to the upper part of one of said settling chambers, and to the lower part of another of said chambers; a conduit connecting said mixing chamber to a third settling chamber; and means for circulating material through said mixing chamber.

Signed by me, this 28" day of December 1905.

THOMAS GRISWOLD, Jr.

Attested by—
  JNO. F. OBERLIN,
  G. W. SAYWELL.